R. W. BENDER.
FILTER FOR REFINING SUGAR.
No. 68,157. Patented Aug. 27, 1867.
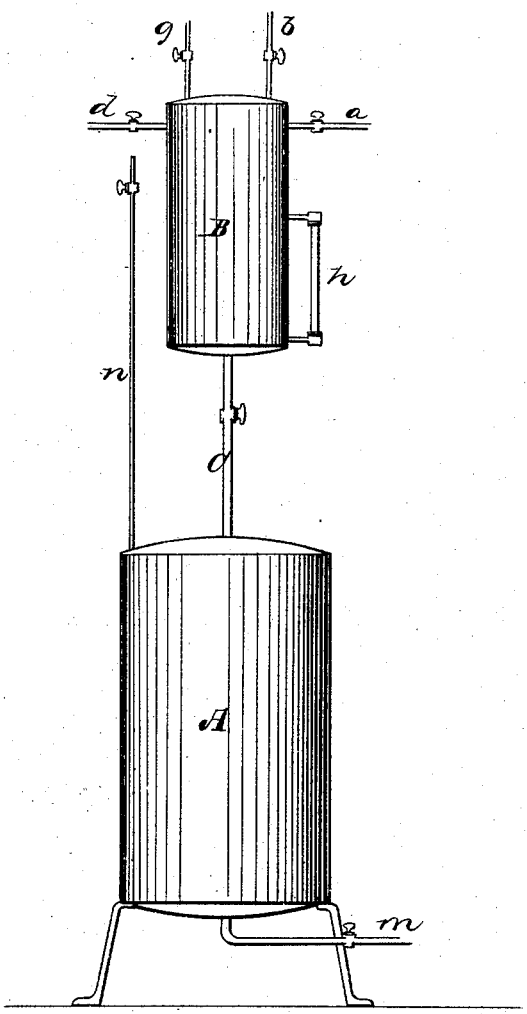

United States Patent Office.

RICHARD W. BENDER, OF NEW YORK, N. Y.

Letters Patent No. 68,157, dated August 27, 1867.

---

IMPROVED FILTER FOR REFINING SUGAR.

---

The Schedule referred to in these Letters Patent and making part of the same.

---

TO ALL WHOM IT MAY CONCERN:

Be it known that I, RICHARD W. BENDER, of New York, in the county and State of New York, have invented a new and improved "Sugar-Filter;" and I do hereby declare that the following is a full and exact description of the same, reference being had to the accompanying drawings, and to the letters of reference marked thereon.

The nature of my invention consists in the combination of a monte-jus with one or more filters to force the sirup through the animal coal by means of live steam acting upon the saccharine liquid in the said monte-jus, whereby a regular and steady pressure is produced, and which enables me to use very fine animal coal in the filters. In the accompanying drawings—

A represents a filter, constructed in the usual manner as regards to size and internal arrangements, and provided with the usual and necessary man-holes, not represented in the drawing. Above this filter a monte-jus, B, is arranged, connected through the pipe C with the top of the filter. This monte-jus consists of a plain cylinder of any desired size, and is provided near the top with a steam pipe, $a$, an escape pipe, $b$, a supply pipe, $d$, and an air pipe, $g$. This air pipe $g$ is attached to the top of the monte-jus, and projects downwards into the same a few inches. Near the bottom of the monte-jus a glass gauge, $h$, is fixed, to indicate the amount of the liquor or sirup in the same. On the top of the filter an air pipe, $n$, is attached, and at the bottom of the same the discharge pipe $m$ is arranged. All the pipes are provided with suitable stop-cocks.

The filter A being charged with animal coal, the cock in the pipe $d$ is opened to admit the liquid so as to fill the filter A and the monte-jus B until the air ceases to escape through the pipe $g$, when the cocks in the pipes $d$ and $g$ are closed. The live steam is then admitted through the steam pipe $a$, pressing upon the surface of the liquid in the monte-jus, and forcing thus the same through the animal coal in the filter A. The velocity with which the liquid is to be forced through the animal coal is regulated by the cock in the pipe $m$. After the saccharine liquid has been forced through one filter the same may be forced upwards through a connecting pipe upon another filter, or through any desired number of filters. The monte-jus may be placed side by side, or even beneath the filter or filters, and the feed and discharge pipes for the liquid or steam or air arranged accordingly.

What I claim as my invention, and desire to secure by Letters Patent, is—

The arrangement herein described for forcing the liquid through the animal coal by means of live steam acting on the said liquid in a monte-jus, connected and combined with the filter or filters, substantially as set forth.

RICHARD W. BENDER.

Witnesses:
  HENRY E. ROEDER,
  JOHN F. ALLEN.